(12) United States Patent
Nakada et al.

(10) Patent No.: US 8,405,365 B2
(45) Date of Patent: Mar. 26, 2013

(54) OUTPUT VOLTAGE CONTROL APPARATUS OF GENERATOR

(75) Inventors: Yasuhiro Nakada, Saitama (JP); Minoru Maedako, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/872,545

(22) Filed: Aug. 31, 2010

(65) Prior Publication Data
US 2011/0089910 A1 Apr. 21, 2011

(30) Foreign Application Priority Data
Oct. 19, 2009 (JP) ................ P2009-240355

(51) Int. Cl.
*H02P 11/00* (2006.01)
*H02P 9/00* (2006.01)
*H02H 7/06* (2006.01)
*H02P 25/08* (2006.01)
*H02P 6/16* (2006.01)

(52) U.S. Cl. ..... 322/28; 322/24; 318/254.1; 318/400.04

(58) Field of Classification Search .............. 322/24, 322/28; 318/254.1, 400.04
See application file for complete search history.

(56) References Cited

U.S. PATENT DOCUMENTS

| | | | | |
|---|---|---|---|---|
| 4,636,706 A * | 1/1987 | Bowman et al. | ................ | 322/28 |
| 5,739,652 A * | 4/1998 | Sriram | ................ | 318/400.04 |
| 6,680,593 B2 * | 1/2004 | Gotou | ................ | 318/400.04 |
| 6,876,115 B2 | 4/2005 | Takahashi et al. | ....... | 310/156.47 |
| 7,834,565 B2 * | 11/2010 | Armstrong | ................ | 318/254.1 |
| 7,969,108 B2 * | 6/2011 | Vermeir | .................... | 318/400.32 |
| 2006/0119300 A1 * | 6/2006 | Armstrong | ................ | 318/254 |
| 2011/0068752 A1 * | 3/2011 | Nakada et al. | .................. | 322/28 |
| 2011/0101928 A1 * | 5/2011 | Kamimura | ....................... | 322/24 |
| 2011/0101929 A1 * | 5/2011 | Maedako et al. | ............... | 322/24 |

FOREIGN PATENT DOCUMENTS

| | | |
|---|---|---|
| EP | 1 289 117 A2 | 3/2003 |
| EP | 1 876 701 A2 | 1/2008 |
| EP | 2 056 444 A2 | 5/2009 |
| JP | 4-172933 A | 6/1992 |
| JP | 6-276800 A | 9/1994 |
| JP | 8-140400 A | 5/1996 |
| JP | 2002-135992 A | 5/2002 |
| JP | 2004-248422 A | 9/2004 |
| JP | 2011087441 A * | 4/2011 |

* cited by examiner

*Primary Examiner* — Pedro J Cuevas

(74) *Attorney, Agent, or Firm* — Arent Fox LLP

(57) ABSTRACT

When a distortion of an output waveform of an alternating-current generator is improved, an output voltage control apparatus of a generator, which has versatility, is obtained. An output voltage control apparatus of a generator (1), including a generator winding (2) and an excitation winding (3) wound around a stator side, a field winding (5) wound around a rotor (4), and a rectifier (12) for rectifying a current generated by the excitation winding (3) and supplying the rectified current to the field winding (5), the output voltage control apparatus includes a field current drive means (20) for comparing an output voltage generated to the generator winding (2) with a reference wave whose distortion ratio is 0% and flowing a field current to the field winding (5) by adjusting a drive timing of a PWM signal output by a drive unit (24) based on a result of the comparison.

5 Claims, 3 Drawing Sheets

US 8,405,365 B2

OUTPUT VOLTAGE CONTROL APPARATUS OF GENERATOR

TECHNICAL FIELD

The invention relates to an output voltage control apparatus of an alternating-current generator having a generator winding, an excitation winding, and a field winding, and more particularly to an output voltage control apparatus of an alternating-current generator preferable to improve a distortion of an output voltage waveform.

BACKGROUND ART

As an output voltage control apparatus of a generator, an automatic voltage regulator for an alternating-current generator is known which has a generator winding and an excitation winding wound to a stator side, a field winding wound around a rotor rotated by a drive source, and a rectifier for rectifying a current generated to the excitation winding and supplying the rectified current to the field winding and keeps a voltage output from the generator winding to a preset voltage by controlling a current supplied to the excitation winding as shown in, for example, Patent Literature 1.

In this kind of the output voltage control apparatus, as a technique for improving a distortion of a waveform of an output voltage waveform from a generator winding, an output waveform is designed near a sine wave by adjusting the number of windings of respective slots of a stator winding for the purpose of a waveform improvement, and a skew and a brake winding are applied.

As shown in, for example, Patent Literature 2, the skew means a shape of electromagnetic steel sheets stacked in a state that slots or a rotor is twisted for the purpose of improving a torque ripple as a motor and a waveform as a generator in a synchronous machine, an induction machine, and the like. The application of the skew has an effect of reducing a torque ripple and improving a waveform of a generated voltage by suppressing a steep change of a magnetic flux in linkage with a winding.

As shown in, for example, Patent Literature 3, the brake winding means a winding formed in such a manner that several slots having the same shape are disposed to a rotor magnetic pole at equal intervals, conductor bars such as copper bars or brass bars having the same shape are inserted into the slots, and both the ends of the conductor bars are brazed to short-circuit rings. Although the brake winding is disposed to a silent-magnetic-pole iron core of a silent-pole type rotary generator for the purpose of hunting prevention, cancellation of reverse phase fractional current, and the like, a voltage waveform can be improved by disposing the brake winding by offsetting it from a center of the silent-magnetic-pole iron core.

CITATION LIST

Patent Literature

Patent Literature 1 Japanese Patent Application Laid-open No. 8-140400

Patent Literature 2 Japanese Patent Application Laid-open No. 2004-248422

Patent Literature 3 Japanese Patent Application Laid-open No. 4-172933

SUMMARY OF INVENTION

Technical Problem

However, in the adjustment of the winding for the purpose of improving the waveform described above, the adjustment is executed under a certain determined load condition. When a generator has a different load ratio, a load condition, under which a distortion ratio is not improved or is deteriorated, may also occur.

Further, the application of the skew and the brake winding has a problem in that a technical capability for manufacturing them is necessary and a manufacturing cost is required.

That is, a distortion ratio improving method, which is effective under any arbitrary load condition and which does not require a manufacturing cost, is desired as the output voltage control apparatus of the generator.

An object of the invention, which is proposed in view of the above circumstances, is to provide an output voltage control apparatus of a generator which has versatility and can be realized at a low cost when a distortion of an output waveform of an alternating-current generator is improved.

Solution to Problem

To achieve the above object, an output voltage control apparatus of a generator (1) according to a first aspect (Claim 1) of the present invention, has a first feature that the output voltage control apparatus that includes a generator winding (2) and an excitation winding (3) wound around a stator side, a field winding (5) wound around a rotor (4) rotated by a drive source, and a rectifier (12) for rectifying a current generated by the excitation winding (3) and supplying the rectified current to the field winding (5), includes a field current drive means (20) for flowing a field current to the field winding (5) by adjusting a drive timing of a PWM signal output.

The present invention of the claim 2 is the output voltage control apparatus of the generator according to claim 1, wherein the field current drive means (20) includes:

a voltage detection unit (22) which detects an output voltage generated to the generator winding (2);

a reference wave recording unit (21) which records a sine wave whose distortion ratio is 0% as a reference wave;

a comparison unit (23) which compares the output voltage with the reference wave;

a drive unit (24) which increases/decreases the drive timing of the PWM signal output based on a result obtained by the comparison unit (23).

The present invention of the claim 3 is the output voltage control apparatus of the generator according to claim 2, wherein the comparison of the output voltage with the reference wave is executed by the comparison unit (23) in synchronization with an ignition timing of the generator (1).

The present invention of the claim 4 is the output voltage control apparatus of the generator according to claim 1, wherein the field current drive means (20) includes a map data recording unit (25) which records a PWM drive timing at which a distortion ratio is minimized as internal data of various kinds of operating conditions of the generator from data of the distortion ratio previously calculated by the various kinds of the operating conditions and determines a drive timing of the field current referring to the internal data according to the various kinds of the operating conditions of the generator (1).

The present invention of the claim 5 is the output voltage control apparatus of the generator according to claim 4, wherein the determination of the drive timing of the field current, which is executed referring to the internal data according to the various kinds of the operating conditions of the generator (1), is executed in synchronization with an ignition timing of the generator (1).

Advantageous Effects of Invention

According to the invention having the first feature (claim 1), when the field current is caused to flow to the field winding (5), since the drive timing of the PWM signal output is adjusted by the field current drive means (20), PWM start phases of a field current drive can be aligned at a timing at which a waveform distortion is corrected and thus a distortion ratio of an output voltage can be adjusted to a minimum point.

According to the invention having a second feature (Claim 2), since the output voltage output from the generator (1) is compared with a recorded reference voltage and a field current is controlled by increasing/decreasing a drive timing of a PWM signal output so that a difference between the output voltage and the reference voltage is minimized, the distortion ratio of the output voltage can be improved.

According to the invention having a third feature (Claim 3), since the output voltage is compared with the reference wave in synchronization with an ignition timing of the generator (1), the distortion ratio of the output voltage can be improved every predetermined cycle.

According to the invention having a fourth feature (Claim 4), since the field current is controlled by determining the PWM drive timing by the internal data which minimizes the distortion ratio previously recorded in the map data recording unit (25) according to an operating state of the generator (1), the distortion ratio of the output voltage can be improved.

According to the invention having a fifth feature (Claim 5), since the drive timing of the field current is determined referring to the internal data in synchronization with the ignition timing of the generator (1), the distortion ratio of the output voltage can be improved every predetermined cycle.

DESCRIPTION OF EMBODIMENTS

Figure 1:
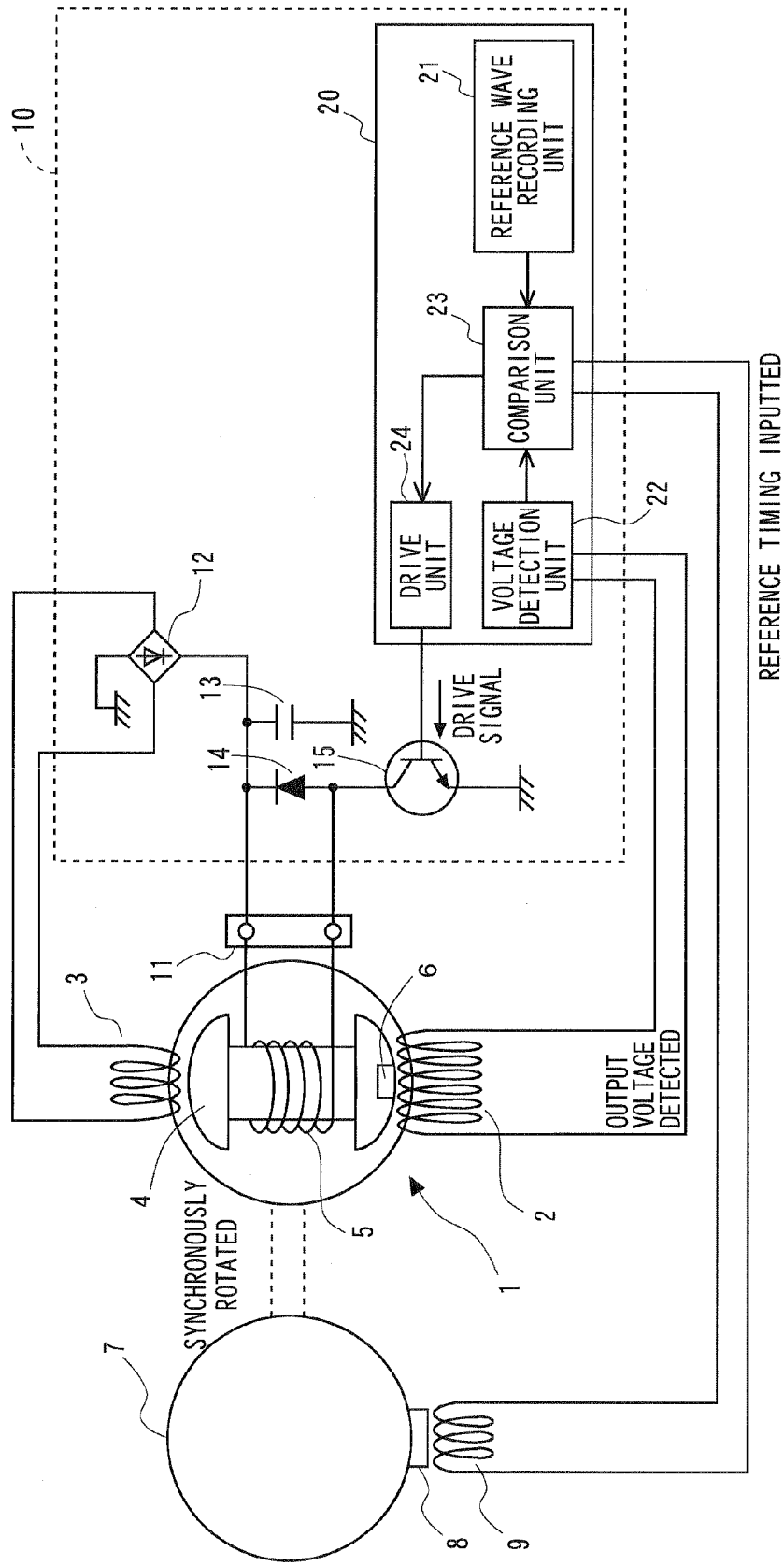
FIG. 1 is an explanatory view of a main portion configuration of a generator including an output voltage control apparatus according to an embodiment of the invention.

The invention will be described below in detail referring to the drawings. FIG. 1 is an explanatory view of a main portion configuration of a generator including an output voltage control apparatus according to an embodiment of the invention.

The generator 1 is a known alternating-current generator and includes a generator winding 2 and an excitation winding 3 disposed to a stator side and a field winding 5 wound around a rotor 4. A permanent magnet 6 for generating an exciting current is attached to the rotor 4.

The rotor 4 is synchronously rotated using a rotation of an engine (not shown) as a drive source. A permanent magnet 8 is attached to a flywheel 7 on an engine side, which is synchronously rotated through a crank shaft, with respect to the rotor 4, and an ignition timing of the engine is detected by detecting an engine phase angle by an engine phase detection coil 9 disposed in the vicinity of the flywheel 7.

The field winding 5 is connected to an automatic voltage regulator (AVR) 10 through a brush 11. The automatic voltage regulator 10 includes a rectifier 12 to input sides of which both the ends of the excitation winding 3 are connected, a capacitor 13 disposed between the rectifier 12 and the ground for smoothing an output voltage of the rectifier 12, a flywheel diode 14 connected in parallel with the field winding 5, a transistor 15 for flowing a field current to the field winding 5 by being turned on and off, and a field current drive circuit (field current drive means) 20 for PWM controlling the field current. An end of the field winding 5 is connected to an output side of the rectifier 12, and the other end of the field winding 5 is connected to a collector side of the transistor 15.

The flywheel diode 14 is disposed to absorb a surge voltage generated at a time energization is stopped when the field current flowing to the field winding 5 is PWM controlled and to smooth the field current.

The field current drive circuit 20 includes a reference wave recording unit 21 for recording a sine wave (reference wave) acting as a reference, a voltage detection unit 22 for detecting an output voltage waveform of the generator 1, a comparison unit 23 for comparing the reference wave with the output voltage waveform, and a drive unit 24 for applying a drive signal to the transistor 15.

The reference wave recording unit 21 previously calculates a sine wave whose distortion ratio is previously set to 0% and records the sine wave as the reference wave.

The voltage detection unit 22 is connected to the generator winding 2 to detect an output voltage of the generator 1.

Figure 2:
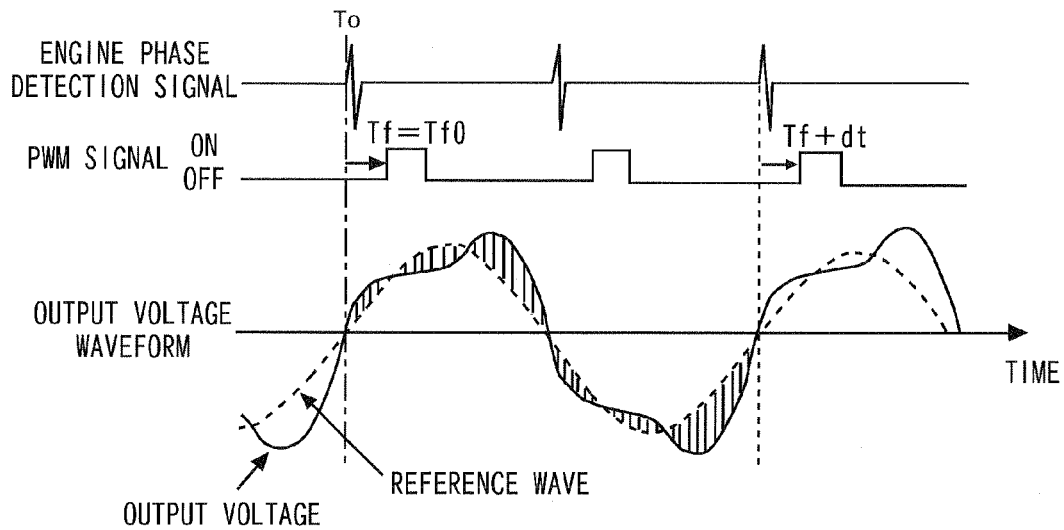
FIG. 2 is a field drive timing chart view showing a PWM signal timing to an output voltage waveform of the generator determined by the output voltage control apparatus of the invention.

The comparison unit 23 calculates a difference δ between the reference wave and the output voltage waveform. The difference δ between the reference wave and the output voltage waveform is shown by $\delta = \int(\text{output voltage} - \text{reference sine wave})dt$ and corresponds to a slant line area of the output voltage waveform shown in FIG. 2.

In the calculation of the difference δ between the reference wave and the output voltage waveform executed by the comparison unit 23 (comparison of the output voltage with the reference wave), the engine phase angle (ignition timing) is detected by the permanent magnet 8 attached to the flywheel 7 and set as a reference timing To (engine phase detection signal in FIG. 2), and a start timing Tf of a field drive PWM is determined by controlling a delay using the reference timing To as a reference.

The difference δ between the reference wave and the output voltage waveform is calculated by the comparison unit 23 in synchronization with the ignition timing of the engine by inputting a reference timing from the engine phase detection coil 9 and calculating and setting a calculation timing of the difference δ at every other time of the ignition timing of the engine.

The drive unit 24 adjusts a drive timing of the PWM signal output by increasing or decreases the field drive timing Tf to minimize the difference δ between the reference wave and the output voltage waveform and flows the field current to the field winding 5 by executing an on/off control of the transistor 15 by applying the PWM signal to a base of the transistor 15.

Figure 3:
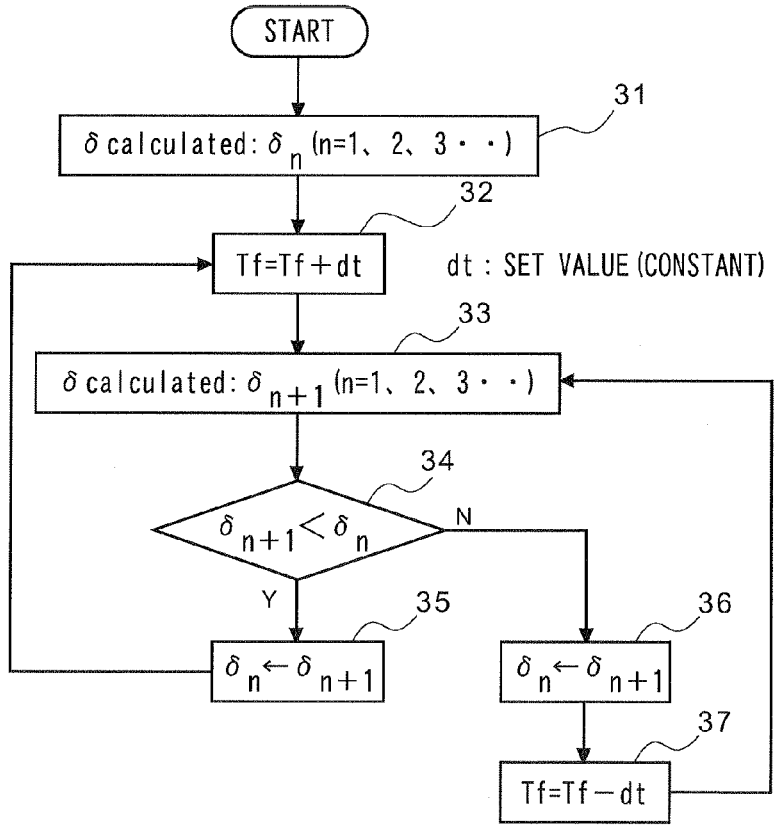
FIG. 3 is a flowchart view for obtaining a field drive timing in the output voltage control apparatus of the invention.

The increase/decrease of the field drive timing Tf is executed according to a flowchart as shown in FIG. 3.

The field current is controlled by delaying the start timing Tf of the field drive PWM to the reference timing To. Tf0 is previously set as an initial value of a delay amount to the reference timing To.

First, at the calculation timing (first ignition timing), the difference $\delta_n$ between the reference wave and the output voltage waveform is calculated (step 31).

Subsequently, a value obtained by adding a set value dt, which is a constant preset to the initial value Tf0 of the delay amount to the reference timing To, is set as a new field drive timing Tf (step 32).

At a next calculation timing (third ignition timing), a difference $\delta_{n+1}$ between the reference wave and the output voltage waveform is calculated (step 33).

When $\delta_n$ is compared with $\delta_{n+1}$ (step 34) and $\delta_n$ is larger than $\delta_{n+1}$, $\delta_{n+1}$ is replaced with $\delta_n$ (step 35), and a value, to which the value dt preset to Tf at a last calculation timing (when $\delta_{n+1}$ is calculated) is added, is set as a new field drive timing Tf (step 32).

When $\delta_n$ is compared with $\delta_{n+1}$ (step 34) and $\delta_{+1}$ is larger than $\delta_n$, $\delta_{n+1}$ is replaced with $\delta_n$ (step 36), and a value, from which the value dt preset to Tf at the last calculation timing (when $\delta_{n+1}$ is calculated) is subtracted, is set as a new field drive timing Tf (step 37).

Thereafter, the drive timing Tf of the PWM signal for controlling the field current is adjusted (increased or decreased) sequentially (at every other time of the ignition timing) by repeating the job so that the difference $\delta$ between the reference wave and the output voltage waveform is minimized.

Next, an operation of the field current drive circuit 20 shown in FIG. 1 will be described.

When the rotor 4 is rotated by the engine and the like, a current is induced to the excitation winding 3 by a magnetic field of the permanent magnet 6. The current is rectified by the rectifier 8 and supplied to the field winding 5 as a direct excitation current.

In the generator 1, when a current is induced to the generator winding 2 by the current flowing to the field winding 5, a reverse electro-motive force is induced to the field winding 5 by a magnetic field generated by the current. Since the current flowing to the field winding 5 is increased/decreased by the reverse electro-motive force, an output of the generator winding 2 is varied.

A voltage (an output voltage of the generator 1) generated to the generator winding 2 is determined according to the current flowing to the field winding 5. Further, it is known that a distortion ratio of the output voltage is changed by a phase (timing) of the PWM signal for controlling the field current.

Note that when direct current components of a non-sine wave alternating-current voltage are shown by $V_0$, $V_1$, $V_2$, $V_3$ . . . (respective effective values), the distortion ratio k(%) is a ratio of total harmonic and a basic wave and calculated by the following equation.

$$k = \frac{\sqrt{V_2^2 + V_3^2 + V_4^2 \ldots}}{V_1} \times 100 \qquad \text{[Equation 1]}$$

Thus, the embodiment executes a control for causing the output voltage waveform to approach to the reference wave by detecting the output voltage of the generator winding 2, comparing the output voltage waveform with the reference wave by the field current drive circuit (field current drive means) 20, and variably adjusting the drive timing of the PWM signal.

That is, the distortion ratio of the output voltage can be improved by variably adjusting the drive timing of the PWM signal as to the field current of the field winding 5 and causing the output voltage waveform generated to the generator winding 2 to approach to the reference wave.

Figure 4:
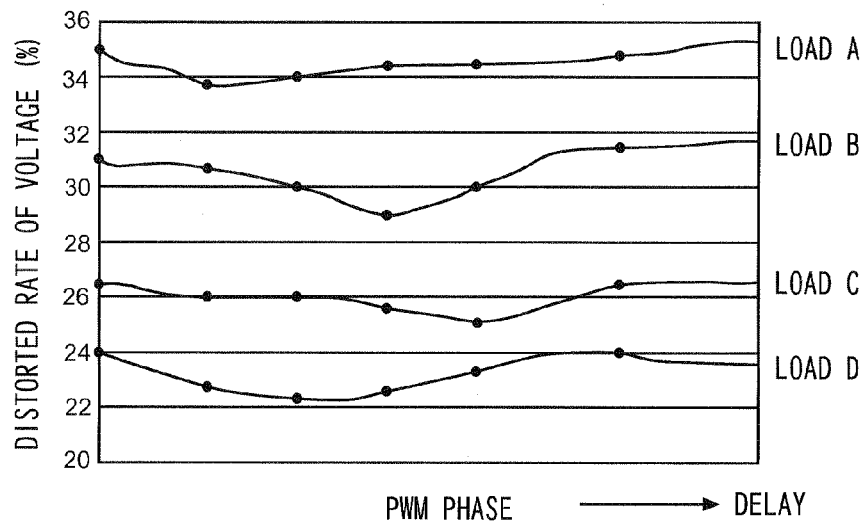
FIG. 4 is a graph showing a correlation relation between a PWM phase and a distortion ratio of an output voltage to respective loads in an alternating-current generator.

For example, as to different loads A, B, C, and D connected to the generator 1, even when phases of the drive timing of the PWM signal outputs whose distortion ratios to the respective loads are minimized are different as shown in FIG. 4, the drive timing of the PWM signal outputs are adjusted by the field current drive circuit 20, so that PWM start phases of a field current drive can be aligned at a timing at which a waveform distortion is corrected. As a result, the distortion ratio of the output voltage can be adjusted to a minimum point according to the respective loads.

Figure 5:
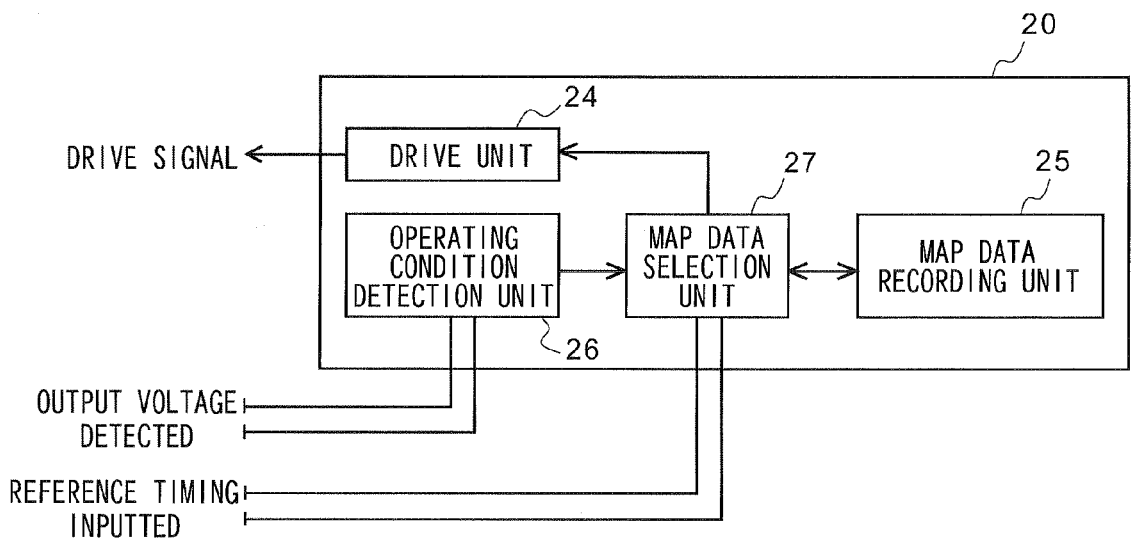
FIG. 5 is a block view showing other configuration example of a field current drive circuit in the output voltage control apparatus of the invention.

FIG. 5 shows an example of other embodiment of the field current drive circuit (field current drive means) 20. The field current drive circuit 20 of FIG. 1 determines the field drive timing by sequentially detecting the output voltage waveform and comparing the output voltage waveform with the reference wave (calculation method with the output voltage waveform), whereas it is determined, in the example, that the field drive timing referring to previously recorded internal data (map data) (map data reference method).

More specifically, a field current drive circuit 20 includes a map data recording unit 25 for recording drive timing of PWM signals as plural pieces of map data, an operating condition detection unit 26 for detecting various kinds of operating conditions of a generator 1, a map data selection unit 27 for determining a drive timing by selecting map data according to the various kinds of the operating conditions of the generator, and a drive unit 24 for applying a drive signal to a transistor 15 at a drive timing of the selected map data.

The map data recording unit 25 previously obtains data of a distortion ratio to a sine wave of an output voltage waveform of the generator 1 using various load currents, load power factors, engine number of revolutions, and the like as conditions and holds PWM drive timing of a field current at which the distortion ratio is minimized to respective output voltage waveforms as the plural pieces of map data corresponding to the various kinds of the operating conditions.

The operating condition detection unit 26 is connected to the generator winding 2 and detects an output voltage of the generator 1. Further, the operating condition detection unit 26 detects the various kinds of the operating condition of the generator 1 such as the load currents, the load power factors, the engine number of revolutions, and the like by respective sensors (not shown) and the like installed to the generator 1 side.

The map data selection unit 27 selects map data for minimizing the distortion ratio to a relevant operating condition according to the various kinds of the operating conditions of the generator 1 detected by the operating condition detection unit 26 and determines a drive timing.

Map data, which is appropriate for an operating state at that time, is selected in synchronization with an ignition timing at every other time of the ignition timing of the engine by inputting a reference timing to the map data selection unit 27 from an engine phase detection coil 9.

The drive unit 24 executes a turn on/off control of the transistor 15 by applying the PWM signal to a base of the transistor 15 at a drive timing at which the PWM signal is output according to the map data selected by the map data selection unit 27 and flows a field current to a field winding 5.

According to the respective embodiments of the field current drive circuit (field current drive means) 20 described above, when the field current is caused to flow to the field winding 5, the drive timing of the PWM signal output is adjusted by the field current drive circuit 20. Therefore, the PWM start phases of the field current drive are aligned at the timing at which the waveform distortion is corrected and, the distortion ratio of the output voltage of the generator 1 can be improved by causing the output voltage to approach to the sine waveform.

Accordingly, when a distortion of an output waveform of an alternating-current generator is improved, the distortion ratio of the output voltage can be improved by adjusting the drive timing of the PWM signal output by the field current drive circuit 20. Therefore, the improvement can be achieved only by changing a program without adding a hardware component, and as a result, the improvement of the distortion ratio has versatility as well as can be realized at a low cost.

REFERENCE SIGNS LIST

1 . . . generator
2 . . . generator winding
3 . . . excitation winding
4 . . . rotor
5 . . . field winding
6 . . . permanent magnet
7 . . . flywheel
8 . . . permanent magnet
9 . . . engine phase detection coil
10 . . . automatic voltage regulator (AVR)
12 . . . rectifier
14 . . . flywheel diode
20 . . . field current drive circuit (field current drive means)
21 . . . reference wave recording unit
22 . . . voltage detection unit
23 . . . comparison unit
24 . . . drive unit
25 . . . map data recording unit
26 . . . operating condition detection unit
27 . . . map data selection unit

The invention claimed is:

1. An output voltage control apparatus of a generator (1) comprising a generator winding (2) and an excitation winding (3) wound around a stator side, a field winding (5) wound around a rotor (4) rotated by a drive source, and a rectifier (12) for rectifying a current generated by the excitation winding (3) and supplying the rectified current to the field winding (5), the output voltage control apparatus comprising:
field current drive means (20) which flows a field current to the field winding (5) by adjusting a drive timing of a PWM signal output.

2. The output voltage control apparatus of the generator according to claim 1, wherein the field current drive means (20) includes:
a voltage detection unit (22) which detects an output voltage generated to the generator winding (2);
a reference wave recording unit (21) which records a sine wave whose distortion ratio is 0% as a reference wave;
a comparison unit (23) which compares the output voltage with the reference wave;
a drive unit (24) which increases/decreases the drive timing of the PWM signal output based on a result obtained by the comparison unit (23).

3. The output voltage control apparatus of the generator according to claim 2, wherein the comparison of the output voltage with the reference wave is executed by the comparison unit (23) in synchronization with an ignition timing of the generator (1).

4. The output voltage control apparatus of the generator according to claim 1, wherein the field current drive means (20) includes a map data recording unit (25) which records a PWM drive timing at which a distortion ratio is minimized as internal data of various kinds of operating conditions of the generator from data of the distortion ratio previously calculated by the various kinds of the operating conditions and determines a drive timing of the field current referring to the internal data according to the various kinds of the operating conditions of the generator (1).

5. The output voltage control apparatus of the generator according to claim 4, wherein the determination of the drive timing of the field current, which is executed referring to the internal data according to the various kinds of the operating conditions of the generator (1), is executed in synchronization with an ignition timing of the generator (1).

* * * * *